(12) United States Patent
Jha et al.

(10) Patent No.: US 10,462,712 B2
(45) Date of Patent: Oct. 29, 2019

(54) COMMUNICATION SYSTEM

(75) Inventors: Vivek Jha, Tokyo (JP); Vivek Sharma, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 144 days.

(21) Appl. No.: 14/237,854

(22) PCT Filed: Jul. 10, 2012

(86) PCT No.: PCT/JP2012/068040
§ 371 (c)(1),
(2), (4) Date: Feb. 7, 2014

(87) PCT Pub. No.: WO2013/024654
PCT Pub. Date: Feb. 21, 2013

(65) Prior Publication Data
US 2014/0187246 A1  Jul. 3, 2014

(30) Foreign Application Priority Data

Aug. 12, 2011 (GB) .................................. 1113943.3

(51) Int. Cl.
*H04W 36/00* (2009.01)
*H04W 48/08* (2009.01)
(Continued)

(52) U.S. Cl.
CPC ......... *H04W 36/0055* (2013.01); *H04L 5/001* (2013.01); *H04L 5/0098* (2013.01);
(Continued)

(58) Field of Classification Search
CPC ..... H04L 5/001; H04L 5/0098; H04L 5/0032; H04L 5/0035; H04L 63/101; H04L 63/08; H04L 63/102; H04W 36/0055; H04W 48/08; H04W 4/08; H04W 84/045; H04W 8/20; H04W 12/08; H04W 24/10; H04W 36/0072; H04W 36/0077; H04W 36/0083;
(Continued)

(56) References Cited

U.S. PATENT DOCUMENTS 8,265,033 B2  9/2012 Gunnarsson et al.
8,553,712 B2  10/2013 Ghosh et al.
(Continued)

FOREIGN PATENT DOCUMENTS

CN  101938796 A  1/2011
EP  2 242 300 A1  10/2010
(Continued)

OTHER PUBLICATIONS

Japanese Office Action dated Jan. 28, 2015.
(Continued)

Primary Examiner — Khoi H Tran
Assistant Examiner — B M M Hannan
(74) Attorney, Agent, or Firm — Sughrue Mion, PLLC

(57) ABSTRACT

A communication system is presented in which a base station operates a each of a plurality of cells using a respective component carrier. When the base station decides to configure a mobile telephone to use additional cells of the plurality of cells, a access control procedure is initiated to determine for each cell whether the configuration should be allowed.

4 Claims, 9 Drawing Sheets

(51) Int. Cl.
*H04L 5/00* (2006.01)
*H04W 8/20* (2009.01)
*H04W 84/04* (2009.01)
*H04W 4/08* (2009.01)

(52) U.S. Cl.
CPC .............. *H04W 48/08* (2013.01); *H04W 4/08* (2013.01); *H04W 8/20* (2013.01); *H04W 84/045* (2013.01)

(58) Field of Classification Search
CPC ........... H04W 56/0045; H04W 72/042; H04W 72/0446; H04W 72/0453; H04W 8/186; H04W 92/20; H04W 16/24; H04W 36/0066; H04W 36/04; H04W 36/08; H04W 84/042; H04W 88/08; H04W 8/06
USPC .................. 455/436; 370/329, 331, 252, 336
See application file for complete search history.

(56) References Cited

U.S. PATENT DOCUMENTS

| | | | |
|---|---|---|---|
| 2009/0047960 A1* | 2/2009 | Gunnarsson | H04J 11/0093 455/436 |
| 2009/0176490 A1* | 7/2009 | Kazmi | H04J 11/0093 455/434 |
| 2009/0196196 A1 | 8/2009 | Ghosh et al. | |
| 2009/0239533 A1* | 9/2009 | Somasundaram | H04J 11/0093 455/434 |
| 2010/0110987 A1 | 5/2010 | Subramanian et al. | |
| 2010/0113020 A1 | 5/2010 | Subramanian et al. | |
| 2010/0157943 A1 | 6/2010 | Horn | |
| 2010/0157944 A1 | 6/2010 | Horn | |
| 2010/0161794 A1 | 6/2010 | Horn | |
| 2010/0210268 A1* | 8/2010 | Lim | H04W 36/04 455/436 |
| 2010/0278147 A1 | 11/2010 | Horn et al. | |
| 2011/0070897 A1* | 3/2011 | Tang | H04W 24/02 455/456.1 |
| 2011/0170517 A1* | 7/2011 | Bakker | H04W 36/0033 370/331 |
| 2011/0171915 A1* | 7/2011 | Gomes | H04W 24/10 455/73 |
| 2011/0171953 A1* | 7/2011 | Faccin | H04W 48/08 455/426.1 |
| 2011/0269464 A1* | 11/2011 | Xu | H04W 36/0033 455/436 |
| 2011/0280218 A1 | 11/2011 | Huang et al. | |
| 2011/0312316 A1* | 12/2011 | Baldemair | H04L 5/001 455/422.1 |
| 2012/0087257 A1* | 4/2012 | Larsson | H04L 5/001 370/252 |
| 2012/0100852 A1* | 4/2012 | Horn | H04W 36/0055 455/436 |
| 2012/0208539 A1* | 8/2012 | Alonso-Rubio | H04W 36/08 455/436 |
| 2012/0230296 A1* | 9/2012 | Hapsari | H04W 36/0038 370/331 |
| 2013/0005340 A1* | 1/2013 | Drazynski | H04W 8/186 455/436 |
| 2013/0013797 A1* | 1/2013 | Henttonen | H04W 4/00 709/229 |
| 2013/0016690 A1* | 1/2013 | Jeong | H04W 24/10 370/329 |
| 2013/0017820 A1* | 1/2013 | Drazynski | H04W 48/16 455/422.1 |
| 2013/0273890 A1* | 10/2013 | Du | H04W 4/08 455/411 |
| 2013/0308606 A1* | 11/2013 | Xu | H04W 8/186 370/331 |
| 2013/0322389 A1* | 12/2013 | Maeda | H04L 5/001 370/329 |
| 2014/0023055 A1* | 1/2014 | Jeong | H04L 5/001 370/336 |
| 2014/0141783 A1* | 5/2014 | Xu | H04W 48/16 455/436 |
| 2016/0269924 A1* | 9/2016 | Fong | H04W 24/10 |

FOREIGN PATENT DOCUMENTS

| | | | |
|---|---|---|---|
| GB | 2479534 A | 10/2011 | |
| JP | 2010-537480 A | 12/2010 | |
| JP | 2011-514725 A | 5/2011 | |
| JP | 2012-513732 A | 6/2012 | |
| JP | 2012-513734 A | 6/2012 | |
| JP | 2012-514918 A | 6/2012 | |
| WO | 2008/097185 A2 | 8/2008 | |
| WO | WO 2010/074401 A2 | 7/2010 | |
| WO | WO 2010/075470 A1 | 7/2010 | |
| WO | WO 2010/075473 A2 | 7/2010 | |
| WO | WO 2010/083767 A1 | 7/2010 | |
| WO | WO 2011021547 * | 2/2011 | ............ H04W 36/24 |
| WO | WO 2011/120967 A1 | 10/2011 | |

OTHER PUBLICATIONS

Samsung, Carrier Aggregation; measurement related issues, 3GPP TSG-RA N2#72 meeting Tdoc R2-106456, 3GPP, Nov. 19, 2010, URL, www.3gpp.org/ftp/tsg_ran/WG2_RL2/TSGR2_72/DOCS/R2-106456.zip.
International Search Report in PCT/JP2012/068040 dated Apr. 2, 2013 (English Translation Thereof).
3GPP TS 36.331 v 10.2.0, 3$^{rd}$ Generation Partnership Project; Technical Specification Group Radio Access Network; Evolved Universal Terrestrial Radio Access (E-UTRA); Radio Resource Control (RRC); Protocol Specification (Release 10), Jun. 2011, pp. 1-294.
Research in Motion et al, "Support of Carrier Aggregation with Heterogeneous Network Deployment", 3GPP DRAFT; R1-094112, Oct. 12-16, 2009, pp. 1-3.
Qualcomm Europe, "DL Carrier Aggregation Performance in Heterogeneous Networks", 3GPP DRAFT; R1-093145, Aug. 24-28, 2009, pp. 1-10.
Jian Li et al, "Flexible Carrier Aggregation for Home Base Station in IMT-Advanced System" Wireless Communications, Networking, and Mobile Computing, 2009, WICOM'09, 5$^{th}$ International Conference ON, IEEE, pp. 1-4.
Chinese Office Action related to Chinese Application No. 201280039462.3; dated Nov. 18, 2016.
Communication dated Apr. 29, 2019 from the European Patent Office in application No. 12743244.1.

* cited by examiner

COMMUNICATION SYSTEM

TECHNICAL FIELD

The present invention relates to mobile telecommunication networks, particularly but not exclusively networks operating according to the 3$^{rd}$ Generation Partnership Project (3GPP) standards or equivalents or derivatives thereof. The invention has particular although not exclusive relevance to the use of carrier aggregation by base stations operating cells as open access mode, closed access mode, or hybrid access mode cells.

BACKGROUND ART

Under the 3GPP standards, a NodeB (or an eNodeB/eNB in the case of the so called 'Long Term Evolution' or 'LTE') is a base station via which mobile devices connect to the core network. Historically, base stations comprised 'macro' base stations which provide communication cells having a relatively large geographical coverage. More recently, however, base stations having a more limited geographical coverage have also been standardised to provide improved coverage in geographical areas where a macro base station's coverage is known to deteriorate and/or to provide additional services targeted at specific users or groups of users.

Specifically, for example, the 3GPP standards body has adopted a standard for so called 'home' or 'femto' base stations which provide so called 'femto' cells having a relatively limited geographical coverage. Where the home base station is operating in accordance with the LTE standards, it is sometimes referred to as a HeNB. The home base station is also sometimes referred to as a femto cell, especially in the case of the so called WiMAX network. Typically, a home base station provides a radio coverage (for example, 3G/4G/WiMAX) within a limited geographical area, often within a building, for example in a home, a small or medium sized enterprise, a shopping mall etc., and connects to a core network via a suitable public network (for example via an ADSL link to the Internet) or operator network.

Optionally, the radio coverage provided by the home base stations may be supported via a 'home (e)NodeB gateway' (HNB-GW) which typically aggregates traffic from several home base stations and handles communication between the home base station(s) and at least one mobility management entity (MME) in the core network. The HNB-GW is, in effect, transparent to the MME and the home base station with the HNB-GW appearing to be a mobility management entity (MME) from the perspective of the home base station, and to be a standard base station from the perspective of the mobility management entity (MME).

A home base station can generally be configured according to any of the following access modes:
  a 'closed' access mode in which the home base station operates a closed subscriber group (CSG) cell to which only members of the CSG may be provided access;
  a 'hybrid' access mode in which the home base station operates a CSG cell to which members of the CSG may be provided preferential access whilst non-members are allowed non-preferential (non-CSG) access (for example with a different charging structure, with a different level of service, and/or subject to CSG members being able to successfully access the cell during high load scenarios); and
  an 'open' access mode in which the home base station operates as a normal (non-CSG) cell to which access is provided openly.

It has also been decided, as part of the 3GPP standardisation process, that downlink operation for system bandwidths beyond 20 MHz will be based on the aggregation of a plurality of component carriers at different frequencies (this is referred to as carrier aggregation). Such carrier aggregation can be used to support operation in a system both with and without a contiguous spectrum (for example, a non-contiguous system may comprise component carriers at 800 MHz, 2 GHz, and 3.5 GHz).

Carrier aggregation can be particularly beneficial in a heterogeneous network (HetNet), even when the system bandwidth is contiguous, and does not exceed 20 MHz because multiple carriers enable interference management between different classes of cells (e.g. between a macro cell of a macro base station and femto cells operated by a home base station) and also between open access, hybrid and closed subscriber group (CSG) cells operating in the same geographical vicinity.

In accordance with carrier aggregation, therefore, a macro or home base station can operate a first 'primary' cell (PCell) using a first component carrier and at least one further 'secondary' cell (SCell) on a further component carrier. Further, in accordance with operation of home base stations, a home base station can operate a PCell using a first component carrier and having a first access mode (closed, hybrid or open) and an SCell using a second component carrier and having a second access mode (closed, hybrid or open), which second access mode may be different to the first access mode. A home base station can also operate a PCell having a hybrid or closed access mode with an associated first CSG comprising a first set of members and an SCell having a hybrid or closed access mode an associated second CSG comprising a second set of members, which second set of members may be different to said first set of members.

Thus, the use of open, hybrid, and closed access mode cells, in combination with carrier aggregation, has the potential to provide an operator of a home base station with great flexibility to operate different cells for different groups of subscribers—potentially with different charging policies for each cell. For example, a home base station operator could, theoretically, set up their home base station to provide a PCell to a relatively large CSG having a relatively large number of members, and an SCell to a smaller CSG, comprising a subset of the relatively large CSG (e.g. whose members are willing to pay a premium to have access to the additional resources of the SCell). Several other similar scenarios are, of course, possible with different cells (primary or secondary) serving distinct or overlapping subscriber groups or with one cell serving any user (i.e. open access mode), another serving only members of a particular CSG (i.e. closed access mode), and/or another serving members of the CSG preferentially (i.e. hybrid access mode) but allowing other users in when sufficient resources/quality of service are available.

However, there are still a number of technical issues with the use of open, hybrid, and closed access mode cells, in combination with carrier aggregation, which need to be addressed if the above flexibility is to be fully realised. Firstly, for example, the aggregation of one component carrier with one or more others to provide a PCell and one or more SCells is based on radio conditions. Hence, a home base station that operates a PCell and an SCell may make a decision to initiate the configuration of user equipment that is connected via the PCell for use of the SCell (referred to as SCell addition) based on radio condition alone (e.g. responsive to a measurement report from the user equipment. Thus the user equipment of a subscriber to a CSG of a closed/hybrid access mode PCell may be configured to use a closed access mode SCell having a CSG to which the user is not a subscriber.

Another potential issue arises when the different cells (PCell/SCell(s)) via which the user equipment is connected (or is about to be configured to use) have different respective CSGs for which different respective charging structures apply. In this situation, there is currently no efficient way to determine which charging structure should take precedence over another, and a user is unaware of how conflicts of charging structure will be dealt with (e.g. will they be charged the maximum or minimum charge that applies across all the cells of the aggregated component carriers).

Yet another potential issue may arise, for example, when a home base station operates a closed/hybrid access mode PCell having a first CSG, and a closed/hybrid access mode SCell having a second CSG, and the user equipment of a subscriber to both the first CSG and the second CSG is connected in the PCell and the SCell. In this situation, if the subscriber's subscription to one of the CSGs expires, whilst the other remains valid, the component carrier (cell) configuration in the subscriber's user equipment no longer complies with a valid CSG list and the user equipment may continue to use resources of a CSG of which the subscriber is no longer a member (a similar issue arises when user equipment is connected to a plurality of SCells and a CSG subscription expires in respect of one of those SCells).

Moreover, when a handover is required from a source home base station operating primary and secondary cells having a first set of CSGs, to a target home base station operating primary and secondary cells having a different set of CSGs, there are potential issues in how such a handover can be accomplished efficiently whilst maintaining appropriate access controls and membership checks.

SUMMARY

Accordingly, exemplary embodiments of the present invention aim to provide methods and apparatus which at least partially address one or more of the above issues.

According to one aspect of the present invention, there is provided communication apparatus for a cellular communication system, the communication apparatus comprising: means for operating a first cell using a first component carrier and at least one further cell using a further component carrier; means for communicating with a mobile communication device operating in said first cell; means for determining that an attempt should be made to configure said mobile communication device to communicate using the at least one further cell; and means for transmitting a message to a communication entity of said communication system to initiate a procedure for checking whether configuration of said mobile communication device to communicate using the at least one further cell should be allowed; means for receiving, from the communication entity, a message indicating, for each further cell, whether configuration of said mobile communication device to communicate using that further cell should be allowed; and means for communicating with said mobile communication device to configure said mobile communication device to communicate using each further cell for which a respective indication that such configuration should be allowed has been received such that said mobile communication device is configured to communicate using each further cell for which a respective indication that such configuration should be allowed has been received, and said mobile communication device is not configured to communicate using each further cell for which a respective indication that such configuration should be allowed has not been received.

According to one aspect of the present invention, there is provided a communication entity of a cellular communication system in which communication apparatus operates each of a plurality of cells using a respective component carrier, wherein said plurality of said cells comprises a plurality of cells for which a closed subscriber group (CSG) has been defined, the communication entity comprising: means for receiving a message to initiate a procedure for checking whether configuration of a mobile communication device to communicate using any of said cells should be allowed, said message comprising information identifying the CSG for each of the plurality of cells for which a closed subscriber group (CSG) has been defined; means for determining, for each of said cells, whether configuration of a mobile communication device to communicate using said cell should be allowed; and means for generating and transmitting a message indicating for each of said cells whether configuration of said mobile communication device to communicate using that cell should be allowed.

According to one aspect of the present invention, there is provided communication apparatus for a cellular communication system, the communication apparatus comprising: means for communicating with a mobile communication device; means for determining that an attempt should be made to handover communication with said communication device from said communication apparatus to target communication apparatus; means for receiving an indication that said target communication apparatus operates a plurality of target cells each using a different respective component carrier, wherein said plurality of said target cells comprises a plurality of cells for which a closed subscriber group (CSG) has been defined; means for obtaining an indication for each CSG as to whether or not said mobile communication device is a member of said CSG; means for transmitting a message to a communication entity of said communication system to initiate a procedure for checking whether configuration of said mobile communication device to communicate using any of said target cells should be allowed, said message comprising information identifying each CSG for which a respective indication that said mobile communication device is a member has been obtained; and means for communicating with said mobile communication device to complete said handover procedure for each said target cell for which configuration of said mobile communication device to communicate using that target cell is allowable.

According to one aspect of the present invention, there is provided communication apparatus for a cellular communication system, the communication apparatus comprising: means for operating each of a plurality of cells using a respective component carrier, wherein said plurality of said cells comprises at least one cell for which a closed subscriber group (CSG) has been defined; means for communicating with a mobile communication device operating in at least one said cell for which a CSG has been defined of which the mobile communication device is a member; means for obtaining an indication that CSG membership of at least one cell in which the mobile communication device is operating has expired for said mobile communication device; and means for ceasing CSG based communication with said mobile communication device in each said cell for which said CSG membership has expired.

According to one aspect of the present invention, there is provided communication apparatus for a cellular communication system, the communication apparatus comprising: means for operating each of a plurality of cells using a respective component carrier; means for communicating with a mobile communication device; means for transmitting a message to a communication entity of said communication system to initiate a procedure for checking whether configuration of said mobile communication device to communicate using at least one of said cells should be allowed; means for receiving, from the communication entity, a message indicating, for each cell represented by the message to initiate a procedure for checking whether configuration of said mobile communication device to communicate using at least one of said cells should be allowed; and means for communicating with said mobile communication device to configure said mobile communication device to communicate using at least one cell for which a respective indication that such configuration should be allowed has been received.

According to one aspect of the present invention, there is provided a mobile communication device of a cellular communication system in which communication apparatus operates each of a plurality of cells using a respective component carrier, wherein said plurality of said cells comprises a plurality of cells for which a closed subscriber group (CSG) has been defined, the mobile communication device comprising: means for receiving from said communication apparatus information identifying the CSG (CSG ID) for each of said plurality of cells for which a CSG has been defined; means for determining from said received information identifying the CSG for each said cell whether or not said mobile communication device is a member of said CSG; and means for generating and transmitting a message comprising, for each CSG, information identifying the CSG and information indicating the membership of said mobile communication device in said CSG.

According to one aspect of the present invention, there is provided a method performed by communication apparatus for a cellular communication system, the method comprising: operating a first cell using a first component carrier and at least one further cell using a further component carrier; communicating with a mobile communication device operating in said first cell; determining that an attempt should be made to configure said mobile communication device to communicate using the at least one further cell; and transmitting a message to a communication entity of said communication system to initiate a procedure for checking whether configuration of said mobile communication device to communicate using the at least one further cell should be allowed; receiving, from the communication entity, a message indicating, for each further cell, whether configuration of said mobile communication device to communicate using that further cell should be allowed; and communicating with said mobile communication device to configure said mobile communication device to communicate using each further cell for which a respective indication that such configuration should be allowed has been received such that said mobile communication device is configured to communicate using each further cell for which a respective indication that such configuration should be allowed has been received, and said mobile communication device is not configured to communicate using each further cell for which a respective indication that such configuration should be allowed has not been received.

According to one aspect of the present invention, there is provided method performed by a communication entity of a cellular communication system in which communication apparatus operates each of a plurality of cells using a respective component carrier, wherein said plurality of said cells comprises a plurality of cells for which a closed subscriber group (CSG) has been defined, the method comprising: receiving a message to initiate a procedure for checking whether configuration of a mobile communication device to communicate using any of said cells should be allowed, said message comprising information identifying the CSG for each of the plurality of cells for which a closed subscriber group (CSG) has been defined; determining, for each of said cells, whether configuration of a mobile communication device to communicate using said cell should be allowed; and generating and transmitting a message indicating for each of said cells whether configuration of said mobile communication device to communicate using that cell should be allowed.

According to one aspect of the present invention, there is provided a method performed by communication apparatus for a cellular communication system, the method comprising: communicating with a mobile communication device; determining that an attempt should be made to handover communication with said communication device from said communication apparatus to target communication apparatus; receiving an indication that said target communication apparatus operates a plurality of target cells each using a different respective component carrier, wherein said plurality of said target cells comprises a plurality of cells for which a closed subscriber group (CSG) has been defined; obtaining an indication for each CSG as to whether or not said mobile communication device is a member of said CSG; transmitting a message to a communication entity of said communication system to initiate a procedure for checking whether configuration of said mobile communication device to communicate using any of said target cells should be allowed, said message comprising information identifying each CSG for which a respective indication that said mobile communication device is a member has been obtained; and communicating with said mobile communication device to complete said handover procedure for each said target cell for which configuration of said mobile communication device to communicate using that target cell is allowable.

According to one aspect of the present invention, there is provided a method performed by communication apparatus for a cellular communication system, the method comprising: operating each of a plurality of cells using a respective component carrier, wherein said plurality of said cells comprises at least one cell for which a closed subscriber group (CSG) has been defined; communicating with a mobile communication device operating in at least one said cell for which a CSG has been defined of which the mobile communication device is a member; obtaining an indication that CSG membership of at least one cell in which the mobile communication device is operating has expired for said mobile communication device; and ceasing CSG based communication with said mobile communication device in each said cell for which said CSG membership has expired.

According to one aspect of the present invention, there is provided a method performed by communication apparatus for a cellular communication system, the method comprising: operating each of a plurality of cells using a respective component carrier; communicating with a mobile communication device; transmitting a message to a communication entity of said communication system to initiate a procedure for checking whether configuration of said mobile communication device to communicate using at least one of said cells should be allowed; receiving, from the communication entity, a message indicating, for each cell represented by the message to initiate a procedure for checking whether configuration of said mobile communication device to communicate using at least one of said cells should be allowed; and communicating with said mobile communication device to configure said mobile communication device to communicate using at least one cell for which a respective indication that such configuration should be allowed has been received.

According to one aspect of the present invention, there is provided a method performed by a mobile communication device of a cellular communication system in which communication apparatus operates each of a plurality of cells using a respective component carrier, wherein said plurality of said cells comprises a plurality of cells for which a closed subscriber group (CSG) has been defined, the method comprising: receiving from said communication apparatus information identifying the CSG (CSG ID) for each of said plurality of cells for which a CSG has been defined; determining from said received information identifying the CSG for each said cell whether or not said mobile communication device is a member of said CSG; and generating and transmitting a message comprising, for each CSG, information identifying the CSG and information indicating the membership of said mobile communication device in said CSG.

Although for efficiency of understanding for those of skill in the art, the invention will be described in detail in the context of a 3G system (UMTS, LTE), the principles of the invention can be applied to other systems (such as WiMAX) in which mobile devices or User Equipment (UE) communicate with one of several base stations with the corresponding elements of the system changed as required.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

BRIEF DESCRIPTION OF THE DRAWINGS

Exemplary embodiments of the invention will now be described by way of example only with reference to the attached figures in which.

DETAILED DESCRIPTION OF EXEMPLARY EMBODIMENTS

Overview

Figure 1:
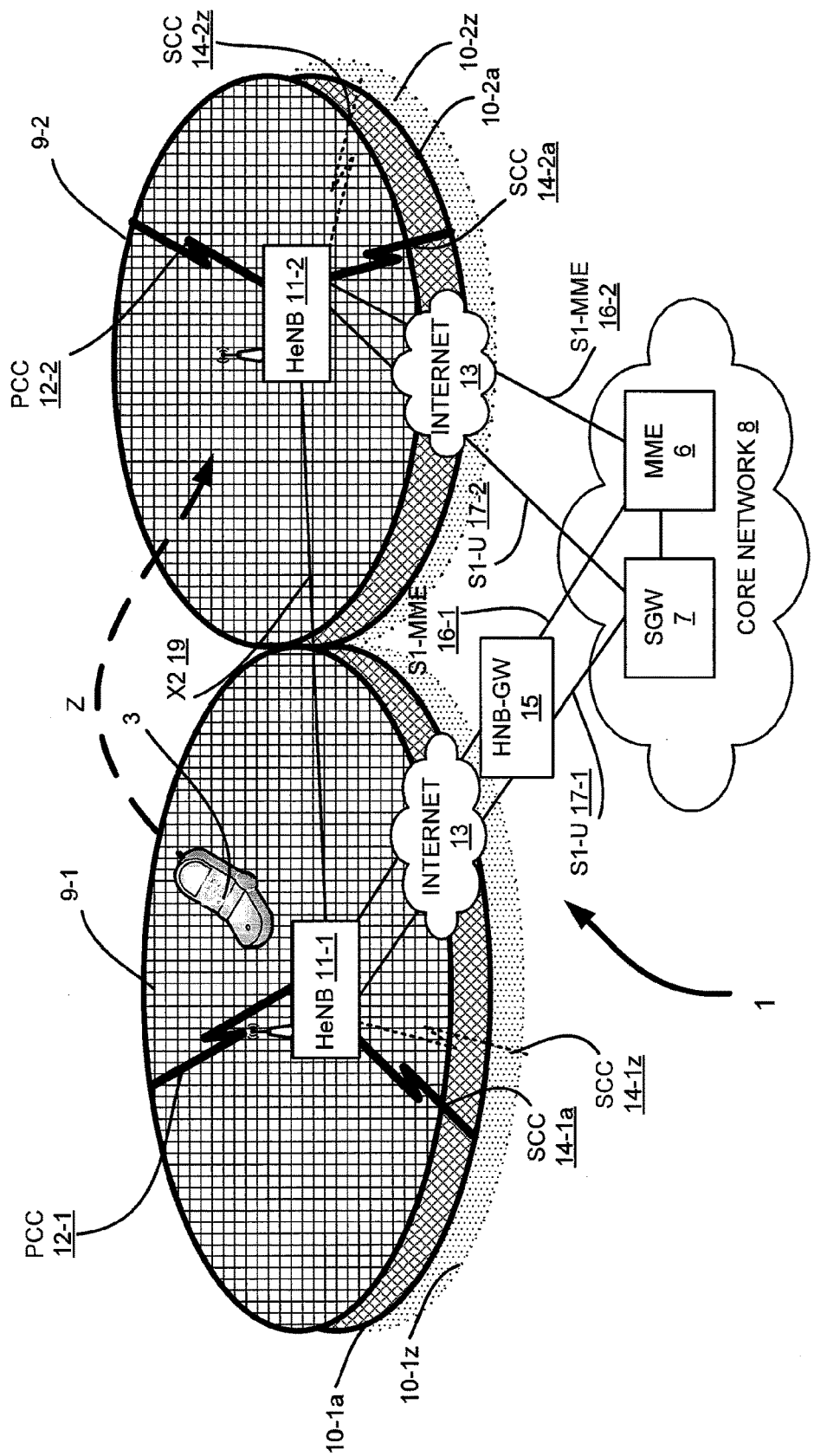
FIG. 1 schematically illustrates a mobile telecommunication system.

FIG. 1 schematically illustrates a mobile (cellular) telecommunication system 1 in which a user of a mobile telephone 3 can communicate with other users (not shown) via a 'home' base station 11-1, which the user may be permitted to access. The home base station 11-1 is coupled by a public data network (in this example the internet 13) and, in the case of home base station 11-1, via a home base station gateway (HNB-GW) 15, to a core telephone network 8.

In the example of FIG. 1, the home base station 11-1 is an LTE home base station (HeNB) 11-1 which connects to the HNB-GW 15 via a suitable broadband internet connection 13 such as an ADSL or cable connection 16 and is programmed with the IP address of the HNB-GW 15 so that all uplink communications are transmitted via HNB-GW 15. The telecommunication 1 also comprises another home base station 11-2 which a user may be permitted to access to communicate with other users via the home base station 11-2, an internet connection 13, and the core telephone network 8 without connecting to an HNB-GW 15. Each home base station 11-1, 11-2 connects to a mobility management entity (MME) 6 and a serving gateway (SGW) 7 within the core network 8 respectively via a first 'S1' logical interface (S1-MME) 16-1, 16-2 and a second 'S1' logical interface (S1-U) 17-1, 17-2. The home base stations also connect to one another via a further 'X2' interface 19.

Each home base station 11-1, 11-2 shown in FIG. 1 operates a respective plurality of 'femto' cells 9-1 and 10-1$a$ to 10-1$z$, and 9-2 and 10-2$a$ to 10-2$z$, using a component carrier set having a respective primary component carrier (PCC) 12-1, 12-2 and at least one respective secondary component carrier (SCC) 14-1$a$ to 14-1$z$, 14-2$a$ to 14-2$z$. Each home base station 11-1, 11-2 operates a respective primary cell (PCell) 9-1, 9-2 on the PCC and at least one secondary cell (SCell) 10-1$a$ to 10-1$z$, 10-2$a$ to 10-2$z$ on a respective SCC 14-1$a$ to 14-1$z$ and 14-2$a$ to 14-2$z$. As seen in FIG. 1, the power of the component carriers 12, 14 used to provide the primary and secondary cells 9, 10 is set such that the geographical coverage of the PCell 9 of a particular home base station 11, of this example, are substantially co-incident with the geographical coverage of the SCell 10 of that base station. However, it will be appreciated that this need not be the case and that the PCell 9 and SCells 10 operated by a home base station 11 need not be coincident. Each cell 9, 10 has its own unique physical cell identity (PCI) associated with it in the memory of the home base station.

Each home base station 11 is also able to operate its respective Pcell 9 and each SCell 10, independently, in any of any of the following access modes:

- a 'closed' access mode in which the home base station 11 operates a closed subscriber group (CSG) cell to which only members of the CSG may be provided access;
- a 'hybrid' access mode in which the home base station 11 operates a CSG cell to which members of the CSG may be provided preferential access whilst non-members are allowed non-preferential (non-CSG) access (for example with a different charging structure, with a different level of service, and/or subject to CSG members being able to successfully access the cell during high load scenarios); and
- an 'open' access mode in which the home base station 11 operates as a normal (non-CSG) cell to which access is provided openly.

Further, when a plurality of cells 9, 10 of a specific home base station 11 are each operating in a closed access mode or a hybrid access mode, the CSG associated with one of those cells 9, 10 may comprise an identical or a different group of subscribers to the CSG associated with another of those cells 9, 10. For example, the CSGs may overlap or may comprise a completely different group of subscribers to one another, or one CSG may comprise a subset of the subscribers in the other CSG.

Access Control and Charging Assessment

As will be described in greater detail below, the components of the telecommunication system 1, and in particular each home base station 11, are configured to enable efficient management of the addition of an SCell 10 to the cell configuration information in the mobile telephone 3 whilst ameliorating the potential conflicts arising from different PCell and SCell charging structures, or different PCell and SCell CSG memberships. This is achieved by providing an access control/membership verification/charging assessment procedure, as part the procedure to configure a mobile telephone 3 to operate using an SCell 10 with an aggregated set of component carriers. Advantageously, the access control/membership verification/charging assessment procedure provided can also manage attempts to aggregate a plurality of cells simultaneously without the inefficiencies associated with repeating the whole procedure for each SCell 10 individually.

CSG Subscription Expiry

The components of the telecommunication system 1, and in particular each home base station 11, are also configured to enable efficient management in the event of expiry of a CSG subscription, while a mobile telephone 3 remains connected in the PCell 9 and/or SCell 10. This is achieved by providing an effective intra home base station handover procedure by which CSG expiry can be notified to the serving home base station 11 and, on receipt of such notification, communication can fall back ('handover') to those cells which the mobile telephone 3 is still allowed to access (e.g. because they are open access or because the user of the mobile telephone 3 is a subscriber to the CSG membership expiry to the MME 6.

Handover

The components of the telecommunication system 1 are also configured to enable efficient management of handover from a source home base station operating primary and secondary cells having a first set of CSGs to a target home base station operating primary and secondary cells having a different set of CSGs. This is achieved by providing handover procedures in which multiple cells operated by a single home base station 11 can be subject to an access control/membership verification/charging assessment procedure at the same time, and the result informed to the target home base station 11 for each cell, thereby avoiding potentially time consuming repeated inappropriate attempts by the target home base station 11 to perform carrier aggregation, for example, by attempting to add component carriers 14 on which closed access mode SCells 10 are provided having CSGs to which the mobile telephone's user is not a subscriber.

Mobile Telephone

Figure 2:
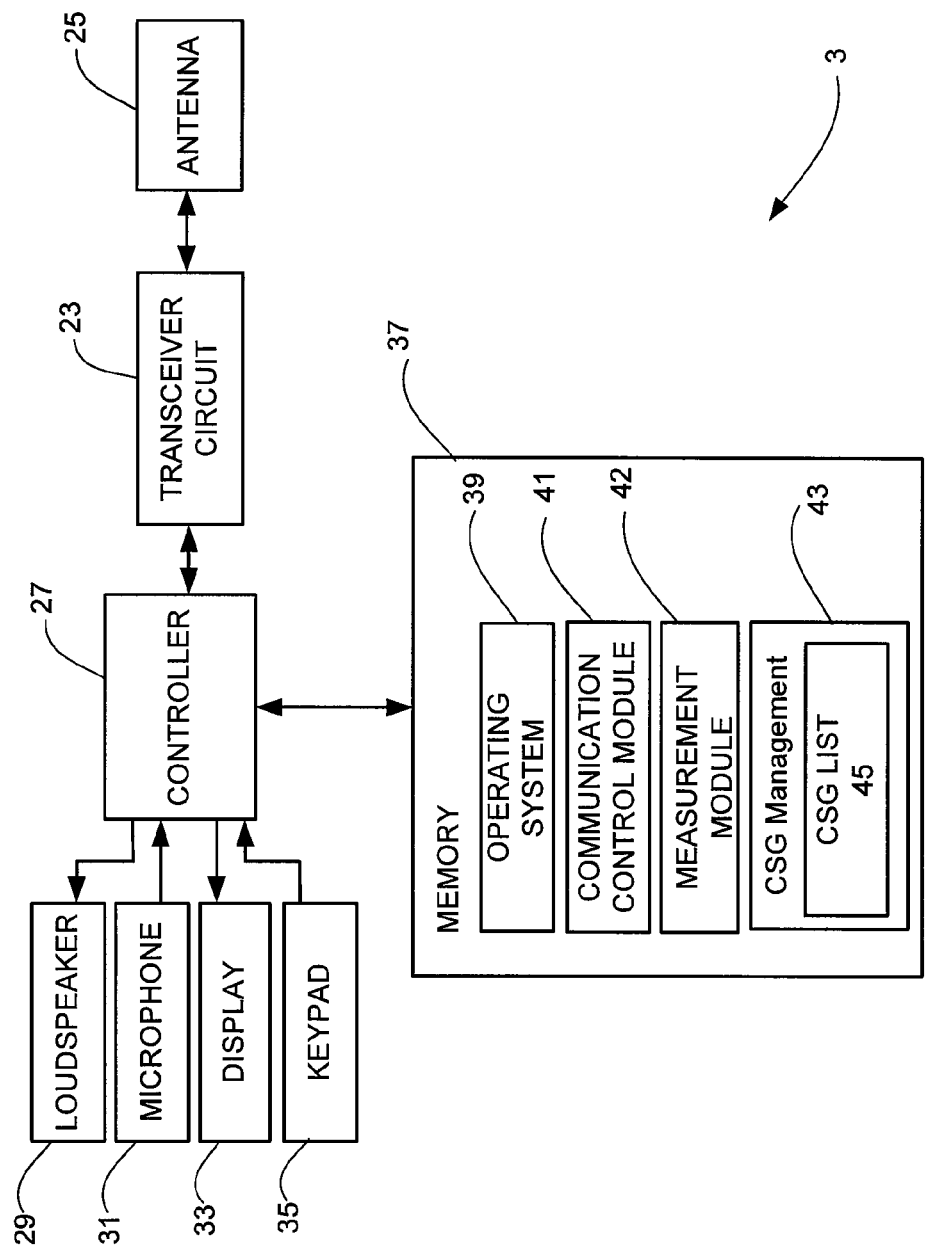
FIG. 2 is a block diagram of a mobile telephone forming part of the system shown in FIG. 1.

FIG. 2 schematically illustrates the main components of the mobile telephone 3 shown in FIG. 1. As shown, the mobile telephone 3 includes transceiver circuitry 23 which is operable to transmit signals to and to receive signals from the home base station 11 via one or more antennae 25. As shown, the mobile telephone 3 also includes a controller 27 which controls the operation of the mobile telephone 3 and which is connected to the transceiver circuit 23 and to a loudspeaker 29, a microphone 31, a display 33, and a keypad 35. The controller 27 operates in accordance with software instructions stored within memory 37. As shown, these software instructions include, among other things, an operating system 39, a communication control module 41, a measurement module 42, and a CSG management module 43.

The communication control module 41 is operable for managing communication with the home base station 11 on the associated component carriers 12, 14. The measurement module 42 receives measurement configuration information from the home base station 11 for the purposes of configuring the mobile communication device 3 to make measurements and/or acquire system information. The measurement module 42 also receives associated requests to take measurements and/or to acquire system information for other (e.g. neighbouring) base stations. The measurement module 42 manages performance of the measurements and acquisition of system information, generates associated measurement reports, and transmits the generated reports to the home base station 11. The CSG management module 43 maintains at least one list 45 containing details of the CSGs of which the mobile telephone 3 is a member (e.g. an operator controlled 'Allowed CSG list' or 'CSG Whitelist' and/or a user controlled 'User CSG list'). It will be appreciated that the CSG list 45 may be stored in the memory 37 of the mobile telephone 3 and/or in a Universal Subscriber Identity Module (USIM) (not shown).

Home Base Station

Figure 3:
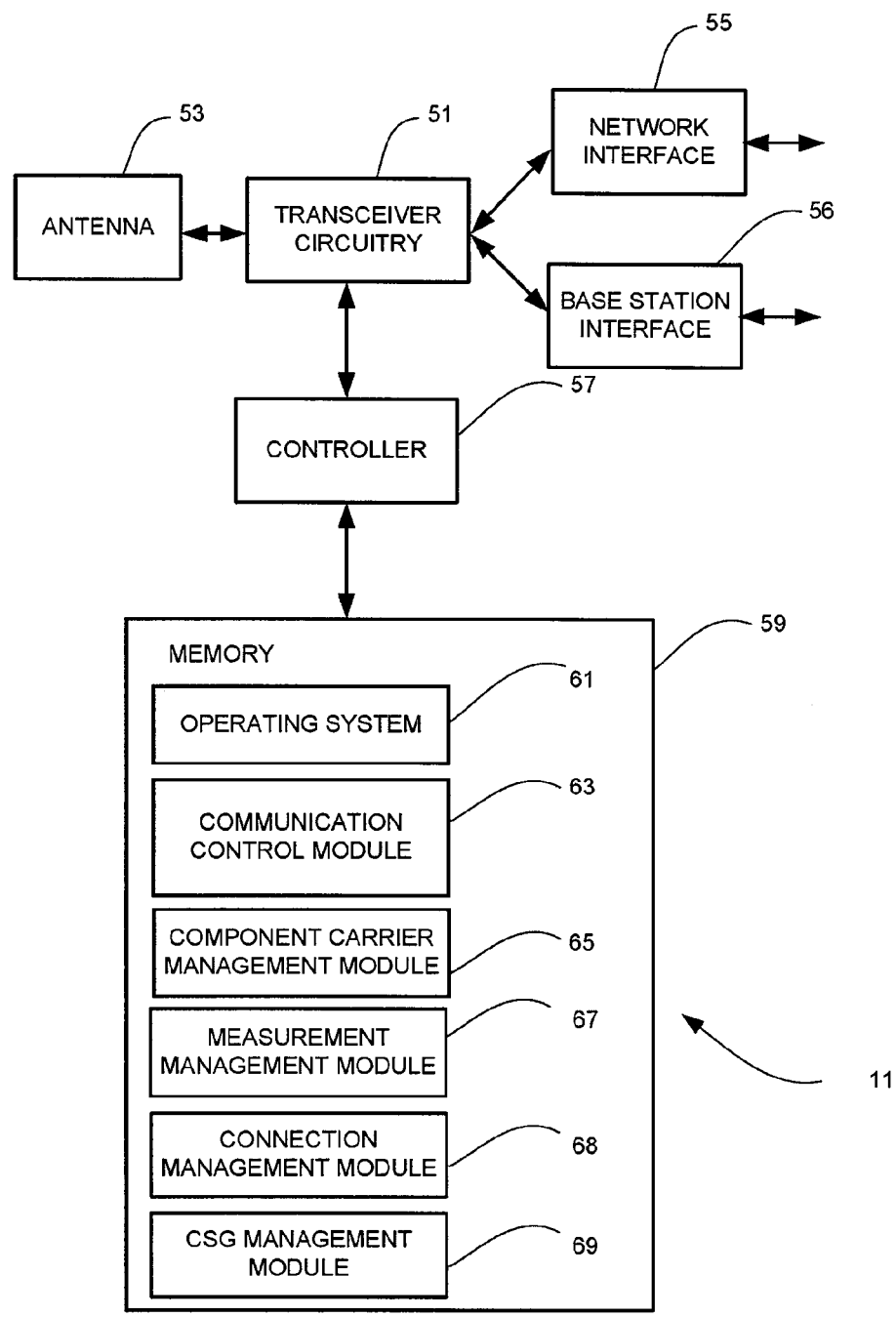
FIG. 3 is a block diagram of a home base station forming part of the system shown in FIG. 1.

FIG. 3 is a block diagram illustrating the main components of one of the home base stations 11 shown in FIG. 1. As shown, the home base station 11 includes transceiver circuitry 51 which is operable to transmit signals to, and to receive signals from, the mobile telephone 3 via one or more antennae 53, which is operable to transmit signals to and to receive signals from the core network 8 (e.g. the MME 6 or SGW 7) via a network interface 55 either directly or indirectly (e.g. via the HNB-GW 15) and which is operable to transmit signals to and to receive signals from a base station via a base station interface 56. The operation of the transceiver circuitry 51 is controlled by a controller 57 in accordance with software stored in memory 59. The software includes, among other things, an operating system 61, a communication control module 63, a component carrier management module 65, a measurement management module 67, and a CSG management module 69.

The communication control module 63 is operable to control communication with the mobile communication devices 3 on the component carriers 12, 14, of the home base station's component carrier set and with other entities in the system. The component carrier management module 65 is operable to manage the use of the component carriers 12, 14 and, in particular, the configuration and operation of the PCell 9 and SCells 10. The component carrier management module 65 also manages the aggregation of the cells 9, 10 for a particular mobile telephone 3 as appropriate. The measurement management module 67 communicates with the mobile communication device 3 to configure the mobile communication device 3 to initiate measurements and/or acquire system information for other (e.g. neighbouring) base stations, and receives and processes measurement reports from the mobile communication device 3 comprising the measurement results/system information. The connection management module 68 is operable to manage the connections of mobile telephones in the PCell 9 and/or SCell(s) 10, and to broadcast system information relating to the cells 9, 10, to mobile telephones 3 in the vicinity. The connection management module 68 is configured to broadcast information such as global cell identity (CGI), tracking area identity (TAI) and CSG ID(s) for each cell operated by the home base station 11. The CSG management module 69 is operable for configuring each cell 9, 10 operated by the home base station 11 to use one of the CSG access modes ('closed, 'hybrid', or 'open') and for setting up CSGs associated with each cell 9, 10.

MME

Figure 4:
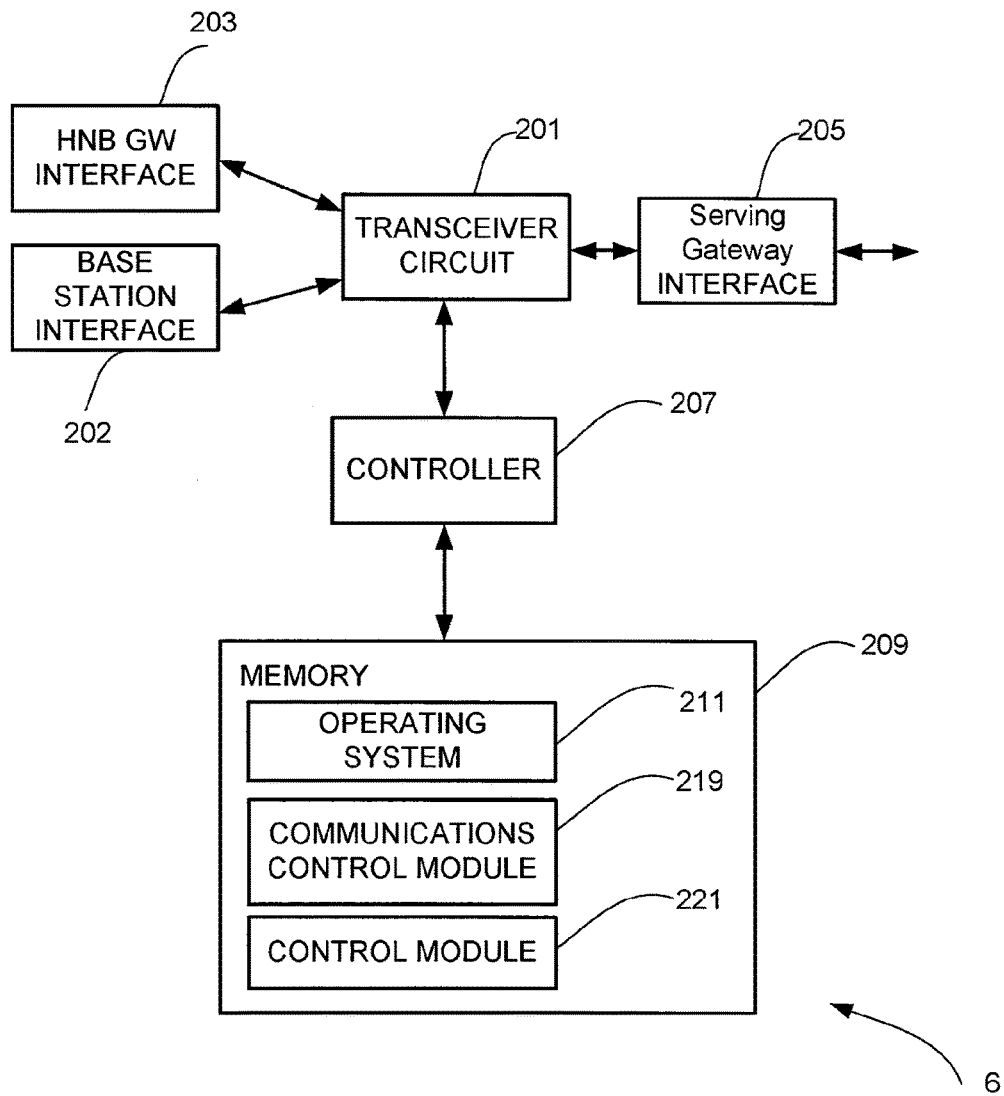
FIG. 4 is a block diagram of a mobility management entity forming part of the system shown in FIG. 1.

FIG. 4 shows an MME 6 having a transceiver circuit 201 coupled to a base station interface 202, a HNB-GW interface 203 and a serving gateway interface 205.

A controller 207 is coupled to control the transceiver circuit 201 and is coupled to a memory comprising software including, among other things an operating system 211, a communications control module 219 and a control module 221.

The communications module 219 is operable to control communications with HNB-GWs 15 via the HNB-GW 203 interface and with base stations (home or macro) via the base station interface 202. Communication between the MME 6 and a serving gateway is conducted via the serving gateway interface 205.

The control module 221 is operable to maintain an association between a mobile telephone 3 and a base station, such as a home base station 11, and to update that association as the mobile device is handed over from one home base station 11 to another home base station 11. In effect the MME 6 acts as a control-node for the network and is responsible for tracking the location of mobile devices 3 as they move within the network. The control module is also operable to perform access control and membership check functions to determine whether a mobile telephone 3 should be allowed to access a particular closed access mode cell or whether it should operate as a CSG member or non-member in a hybrid access mode cell. The control module also performs charging assessments, based on user and operator charging profiles, for determining whether access by a mobile telephone to a particular cell operated by a home base station 11 will cause a charging conflict (e.g. between different charging structures for different CSG groups or between the charging structures and a user charging profile). The charging information, CSG information and tracking information for performing these tasks may be stored locally in one or more databases in the memory 209, or externally.

In the above description, the mobile telephone 3, the home base station 11 and the MME 6 are described, for ease of understanding, as having a number of discrete modules (base station/telephone registration modules, the parameter control module, and the connection/CSG management modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Operation

Access Control and Charging Assessment

Figure 5:
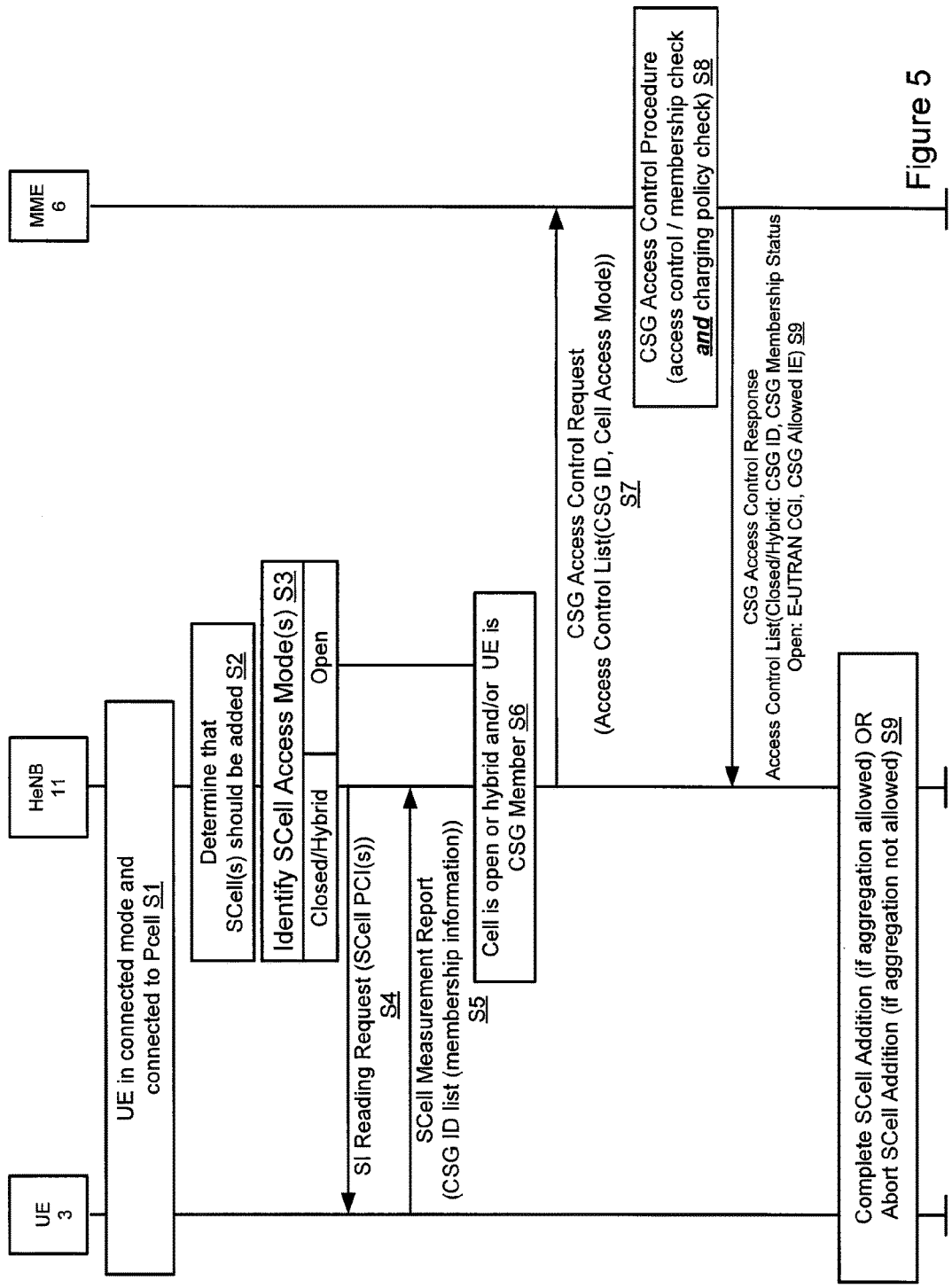
FIG. 5 is a timing diagram indicating an access control and charging assessment procedure for use in the system shown in FIG. 1.

FIG. 5 shows an exemplary timing diagram illustrating a typical procedure for access control/charging assessment employed in the telecommunication system of FIG. 1.

As seen in FIG. 5, when the mobile telephone 3 is in a connected mode in the PCell 9 of home base station 11 (at S1) but not an associated SCell 10, the home base station makes a decision (at S2) to attempt to configure the mobile telephone 3 to operate within at least one SCell 10 (i.e. 'add' one or more cells using an SCell addition procedure). In the exemplary timing diagram of FIG. 5, the home base station 11 makes the decision to add the SCell(s) 10 without a measurement report because the PCell 9 and SCell(s) 10 of this embodiment are geographically coincident (e.g. as shown in FIG. 1) and so when the mobile telephone 3 is connected in the PCell 9 it must also be within the coverage area of the SCell(s) 10. However, the decision to configure the mobile telephone 3 to operate within the SCell(s) 10 may also be based on a measurement report/proximity indication received from the mobile telephone 3 that indicates that it is within the coverage area of the SCell(s) 10.

The home base station 11 determines (at S3) the access mode of each SCell 10 from its associated PCI (e.g. whether or not the PCI is within a "PCI split" comprising a set of PCIs that are reserved for closed access mode CSG cells and/or that are reserved for hybrid access mode cells).

For SCell(s) 10 operating with either a closed or a hybrid access mode, the home base station 11 requests (at S4) that the mobile telephone 3 reads and reports the system information (SI) for each SCell 10 (at S4) by sending a system information request comprising a list of the PCI of each SCell 10 for which information is to be reported. The mobile telephone 3 responds (at S5) with a measurement report that includes, for each PCI in the list, information identifying the CSG (e.g. a CSG ID) and membership information indicating the apparent subscriber status of the mobile telephone 3 within the CSG represented by each CSG ID (e.g. based on a comparison of the CSG ID broadcast for the SCell with the CSG IDs contained in a CSG 'whitelist' stored in the mobile telephone 3). For SCell(s) 10 operating with an open access mode the home base station 11 does not perform steps S4 or S5 because the system information reading procedure is unnecessary.

For each open access cell, hybrid access cell and/or each cell having a CSG for which the measurement report indicates that the user of the mobile telephone 3 is a subscriber (see S6), the home base station 11 initiates (at S7) an access control/membership verification/charging policy assessment procedure by sending an 'access control' request (e.g. a 'CSG Access Control Request') to the MME 6 (via the HNB-GW 15 in the case of home base station 11-1) at S7.

The access control request includes an 'access control list' comprising, for each CSG for which access control is required, a CSG ID, and information identifying the Cell Access Mode. The access control request also includes a CSG Request Type indication that indicates that the request is for the purposes of carrier aggregation.

In response to the access control request (at S8), the MME 6 performs access control and/or membership verification as appropriate depending on the access mode of the cell. The MME 6 also performs a comparison of the operator's charging structure for each SCell 10 and for the PCell 9 via which the mobile telephone 3 is connected. If the charging structure for the Pcell 9 and an SCell 10 is identical, then access can generally be allowed. If, however, the charging structure for the PCell 9 and an SCell 10 is not identical, then access can only be allowed if the operator's charging policy makes clear what charging structure will apply in the event that the mobile connects to both the SCell 10 and PCell 9 simultaneously (e.g. the maximum cost charging structure, minimum cost charging structure, a cumulative charging structure in which the charges of each charging structure (or a proportion thereof are added together). The MME 6 may also check a user charging profile associated with the mobile telephone 3 to confirm whether the user of the mobile telephone has indicated that the charging structure that will be applied if the SCell 10 is added is acceptable.

If the charging structure for the PCell 9 and SCell 10 is not identical, and there is no clearly defined charging policy, or if there is any other charging conflict that cannot be resolved, then 'access control' is deemed to have failed for the SCell 10 in question. If access control and membership verification do not fail for an SCell 10, and no charging related issues arise, 'access control' is deemed not to have failed for the SCell 10 in question.

The MME 6 indicates (at S9) the outcome of the access control/membership verification/charging assessment procedure for each SCell 10 to the home base station 11 by sending a response message (e.g. a CSG Access Control Response). The access control response message comprises, for each cell represented by the access control list in the original access control request, information representing the outcome of the access control/membership verification/ charging assessment procedure.

In the case of an open access mode SCell 10, the MME 6 indicates whether or not component carrier aggregation should be allowed (e.g. in a dedicated 'CC Allowed' information element set to 'allowed' not 'not allowed') in combination with an associated cell global identification (CGI).

In the case of a closed or hybrid access mode SCell 10, the MME 6 reports the CSG ID of the cells for which the access control/membership verification/charging assessment procedure has been successful. In the case of a hybrid mode SCell the MME 6 also reports the membership status of the mobile telephone 3 for the associated CSG. Thus if access control, membership verification and/or the charging assessment fails the MME 6 does not report the associated CSG ID. It will be appreciated, however, that an explicit indication may also be used as in the case of the open access SCell 10 (e.g. in a dedicated 'CC Allowed' information element).

Thus, the presence of a CSG ID for the CSG of a particular closed/hybrid SCell 10, or the presence of CC Allowed set to 'allowed' for an open access mode SCell 10, indicates that carrier is aggregation is allowable.

On receipt of an indication that carrier aggregation is allowable for a particular cell, the home base station 11 can proceed with a conventional SCell addition procedure as defined in the appropriate standards (e.g. using an RRCConnectionReconfiguration message including an sCellToAddModList information element comprising the appropriate SCell radio resource configuration information as referred to in 3GPP TS 36.331 v 10.2.0, section 5.3.10.3b). After the mobile communication device 3 has been configured for operation in the SCell 10, the macro base station 11 activates (or subsequently deactivates) the SCell 10 in the mobile communication device 3, when required. On receipt of an indication that access control has failed, the home base station 11 can abort the SCell addition procedure.

In the absence of an indication that carrier aggregation is allowable (e.g. the absence of a corresponding CSG ID) or on receipt of an indication that access control has failed (e.g. CC Allowed set to 'not allowed'), the home base station 11 aborts the SCell addition procedure for the corresponding cell.

Accordingly, when a home base station 11 that operates a PCell 9 and one or more SCells 10, decides to initiate the configuration of a mobile telephone 3 that is connected via the PCell 9 for use the SCell(s) 10 (e.g. responsive to a measurement report from the mobile telephone 3), the mobile telephone 3 will not be configured to use any SCell 10 for which the user of the mobile telephone 3 is not a valid subscriber to the CSG of that SCell 10. Further, the mobile telephone 3 will not be configured to use the SCell 10 if any charging policy issues (e.g. unresolved conflicts between different charging structures) will result from the addition of the SCell 10.

CSG Subscription Expiry

Figure 6:
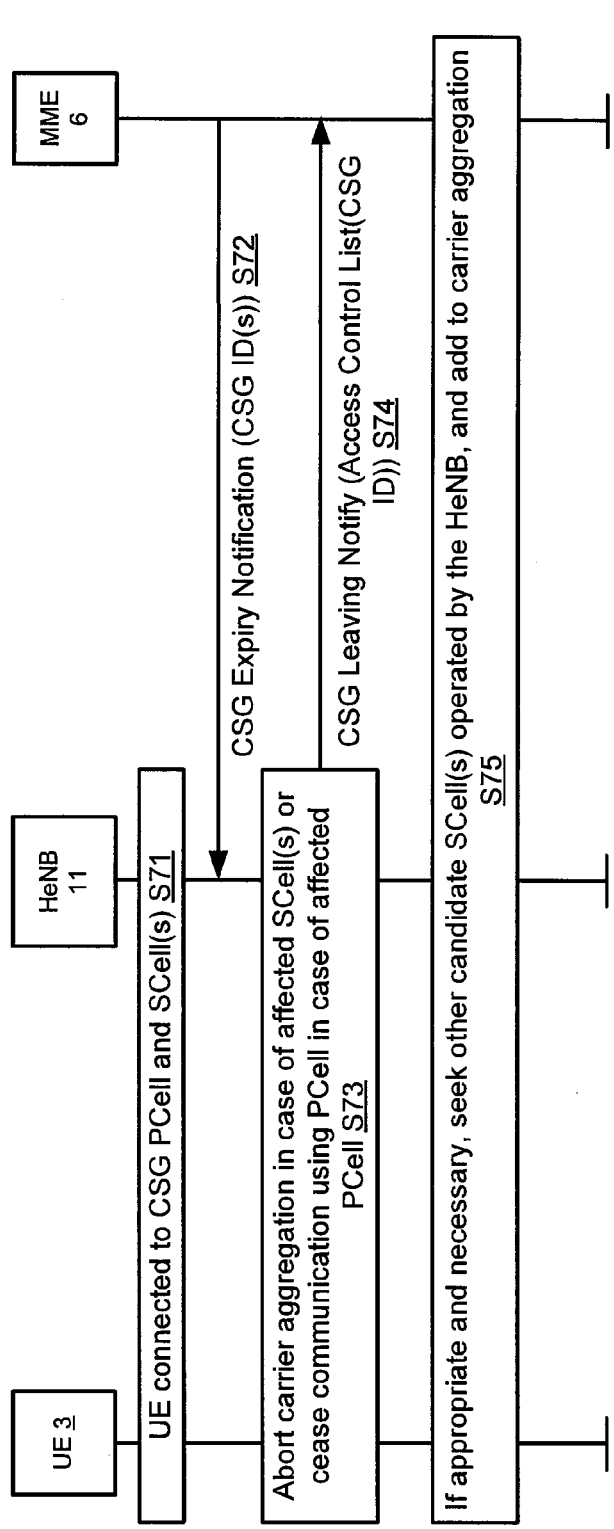
FIG. 6 is a timing diagram indicating a procedure for handling dynamic expiry of CSG membership in the system shown in FIG. 1.

FIG. 6 shows an exemplary timing diagram illustrating a typical procedure for handling dynamic expiry of CSG membership employed in the telecommunication system of FIG. 1.

As seen in FIG. 6, when the mobile telephone 3 is operating (at S71) in a carrier aggregated set of cells comprising a PCell 9 and at least one SCell 10, and the user's subscription to the CSG of one or more of the cells 9, 10 expires, the MME 6 sends (at S72) an indication of CSG expiry to the home base station 11. The indication comprises the CSG ID(s) of the CSG(s) for which expiry has occurred. The home base station 11 responds to this indication (at S73) by initiating an effective intra home base station handover from the cell 9, 10 to which the CSG expiry relates to another aggregated cell 9, 10. The effective intra home base station handover involves ceasing communication (at S73) using the cell(s) 9, 10 to which the CSG expiry relates (and continuing communication in any unaffected cells) and sending (at S74) a notification (e.g. a 'CSG Leaving Notify' message) to the MME 6 to confirm that the affected CSG is no longer being used and that the effective intra home base station handover to another cell 9, 10 has occurred. The notification comprises a list comprising the CSG ID of each affected CSG.

If appropriate and necessary, the home base station 11 may seek one or more other candidate SCells that are operated by the home base station 11 to add to the SCell configuration of the mobile telephone 3 (e.g. at S75).

Further, if every cell 9, 10 in which the mobile telephone 3 is connected has a CSG for which subscription expires, the home base station 11 may initiate an intra home base station handover by adding at least one other candidate SCell 10 subject to an access control procedure similar to the Access Control and Charging Assessment procedure described with reference to FIG. 5 but with the CSG Access Control Request message the CSG Request Type indication set to indicate that the request is for the purposes of handover.

If a cell operates using a hybrid access mode having an associated CSG of which the user of the mobile telephone 3 is a subscriber, and the subscription to that CSG expires, the home base station 11 may return the mobile telephone 3 to non-CSG access to the hybrid access mode PCell 9 after an appropriate access control/membership verification/charging assessment procedure (e.g. similar to that described above) and if appropriate given the capacity/quality of service available to non-CSG users.

Accordingly, when a subscriber's subscription to a CSG expires while the mobile telephone 3 of that subscriber is connected the home base station 11 manages the connection to allow the mobile telephone 3 to continue communicating but without operating as part of a CSG of which the subscriber is no longer a member.

Handover (S1 Based)

Figure 7:
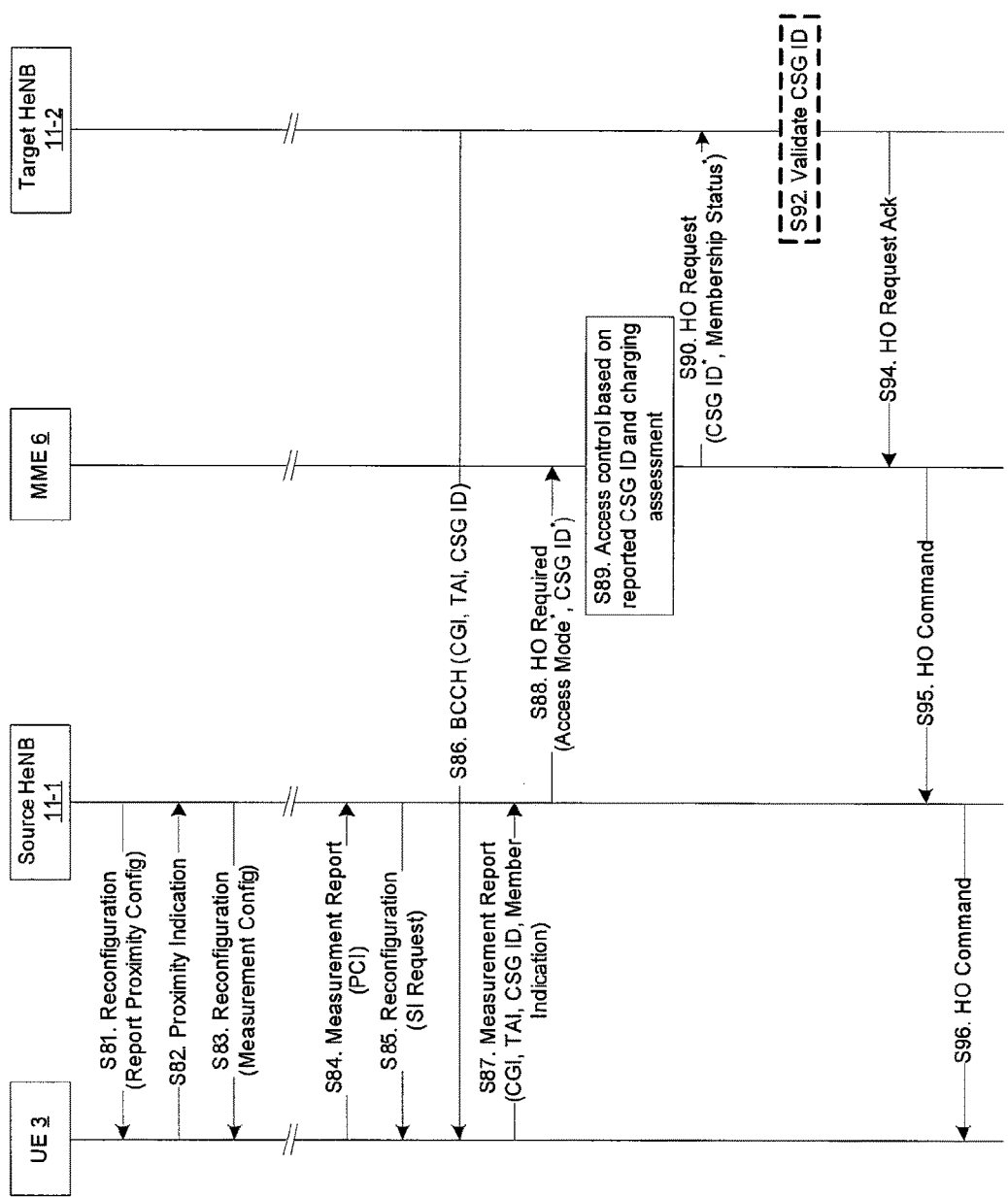
FIG. 7 is a timing diagram indicating a handover procedure by which communication with a mobile device is transferred between a source and target home base station based on communication over a first interface.

FIG. 7 shows an exemplary timing diagram illustrating a typical S1 interface based procedure for handover between two home base stations 11, each operating a plurality of carrier aggregated cells, for the telecommunication system of FIG. 1.

By way of example, a situation is considered in which handover from home base station 11-1 as the source, to home base station 11-2 as the target, occurs (e.g. when the mobile telephone moves as indicated by arrow Z).

The source home base station 11-1 configures (at S81) the mobile telephone 3 with proximity indication control. The mobile telephone 3 responds (at S82) with an "entering" proximity indication, when it determines it may be near the cells 9-2, 10-2 of the target home base station 11-2 and that any CSG ID(s) of one or more of the cells 9-2, 10-2 is in the mobile telephone's CSG whitelist. The proximity indication includes the radio access technology (RAT) and frequency of the cell.

If a measurement configuration is not present for the concerned frequency/RAT the source home base station 11-1 configures (at S83) the mobile telephone 3 with relevant measurement configuration and the mobile telephone 3 responds (at S84) with a measurement report including the PCI of each target cell 9-2, 10-2.

The source home base station 11-1 then requests (at S85) the mobile telephone 3 to acquire system information for the cells 9-2, 10-2 of the target home base station 11-2 identified by the PCIs (i.e. system information may be requested for a plurality of PCIs). In response, the mobile telephone 3 performs (at S86) the system information acquisition to acquire the relevant system information from the target home base station 11-2 (e.g. including the global cell identity (CGI), tracking area identity (TAI) and CSG ID(s) for each cell of the target). The mobile telephone 3 then sends (at S87) a measurement report to the source home base station 11-1 including the CGI, TAI, a CSG ID and "member/non-member" indication for each cell 9-2, 10-2 operated by the target home base station 11-2.

The source home base station 11-1 includes (at S88) the CGI and CSG ID for each component carrier (cell) of the target home base station 11-2 in a handover required message sent to the MME 6. The Cell Access Mode(s) for each component carrier of the target may also be included where the target cell 9, 10 is a hybrid access mode cell.

The MME 6 performs access control/membership verification (at S89) for each CSG cell 9-2, 10-2 based on the CSG ID(s) received for that cell 9-2, 10-2 in the handover required message and the stored CSG subscription data for the mobile telephone 3. The MME 6 also performs an assessment of the operator's charging structure for each of the target cells 9-2, 10-2 (regardless of access mode) and, if any charging issues arise (e.g. as described previously), handover to that cell is deemed to be impermissible and the assessment fails for that cell. If the access control/membership verification/charging assessment procedure fails for every CSG ID provided, the MME 6 ends the handover procedure by replying with the Handover Preparation Failure message.

Assuming that procedure does not fail for every target cell, the process continues.

The MME 6 generates a handover request message including the CSG ID of each target cell for which the access control/membership verification/charging assessment has been successful. For each hybrid cell (identified by the presence the Cell Access Mode in the handover required message) the MME 6 determines the CSG Membership Status of the mobile telephone 3 and includes it in the handover request message. The MME 6 sends (at S90) the handover request message to the target home base station 11-2. The handover request message may also include an explicit indication whether carrier aggregation is allowed for each open access mode cell (e.g. using a 'CC Allowed' IE set to 'allowed' or 'not allowed' in a similar manner to that used for the CSG Access Control Response message described above).

The target home base station 11-2 verifies (S92) that the CSG ID(s) received in the handover request message match the CSG ID broadcast in each of the target cells and if such validation is successful allocates resources appropriately. In the case of a hybrid access mode cell, access by the mobile telephone 3 may be prioritised (over non-member mobile telephones using the hybrid cells) if the CSG Membership Status indicates that the mobile telephone 3 is a member.

The target home base station 11-2 may perform carrier aggregation for cells for which the access control/membership verification/charging assessment procedure has been successful. The target home base station 11-2 does not, however, perform carrier aggregation for those SCells 10 for which a CSG ID is not present in the handover request message. If none of the received CSG ID(s) correspond to a CSG ID broadcast by the target home base station 11-2 then handover resource allocation fails.

If a CSG Membership Status and associated CSG ID are received in the handover request message for a hybrid access mode cell but the CSG ID does not correspond to the CSG ID broadcast by the target cell, the target home base station 11-2 provides access to the cell, to the mobile telephone 3, as if it were a non-member. In this case, the target home base station 11-2 returns, in a handover request acknowledge message, the actual CSG ID broadcast by each target cell for which this applies.

The target home base station 11-2 sends the handover request acknowledge message (at S94) to the MME 6 (via the HeNB GW 15 if present).

The MME 6 sends (at S95) a Handover Command message to the source home base station 11-1. The source home base station 11-1 then transmits the Handover Command (RRC Connection Reconfiguration message including mobility control information) to the mobile telephone 3 to complete the handover process.

Accordingly, handover can occur efficiently without the target home base station attempting to perform carrier aggregation inappropriately, for example by attempting to add component carriers on which closed access mode SCells are provided having CSGs to which the mobile telephone's user is not a subscriber.

X2 Based Handover

An X2 based handover of a UE 3 between home base stations 11-1 and 11-2 will now be described, by way of example only, with reference to the timing diagram of FIG. 8.

As those skilled in the art will appreciate, the X2 interface is the interface via which base stations communicate with each other. In an X2 based handover the handover process is coordinated between the source and target base stations without overall control by the core network. X2 based handover is therefore advantageous as it reduces load on the core network.

Figure 8:
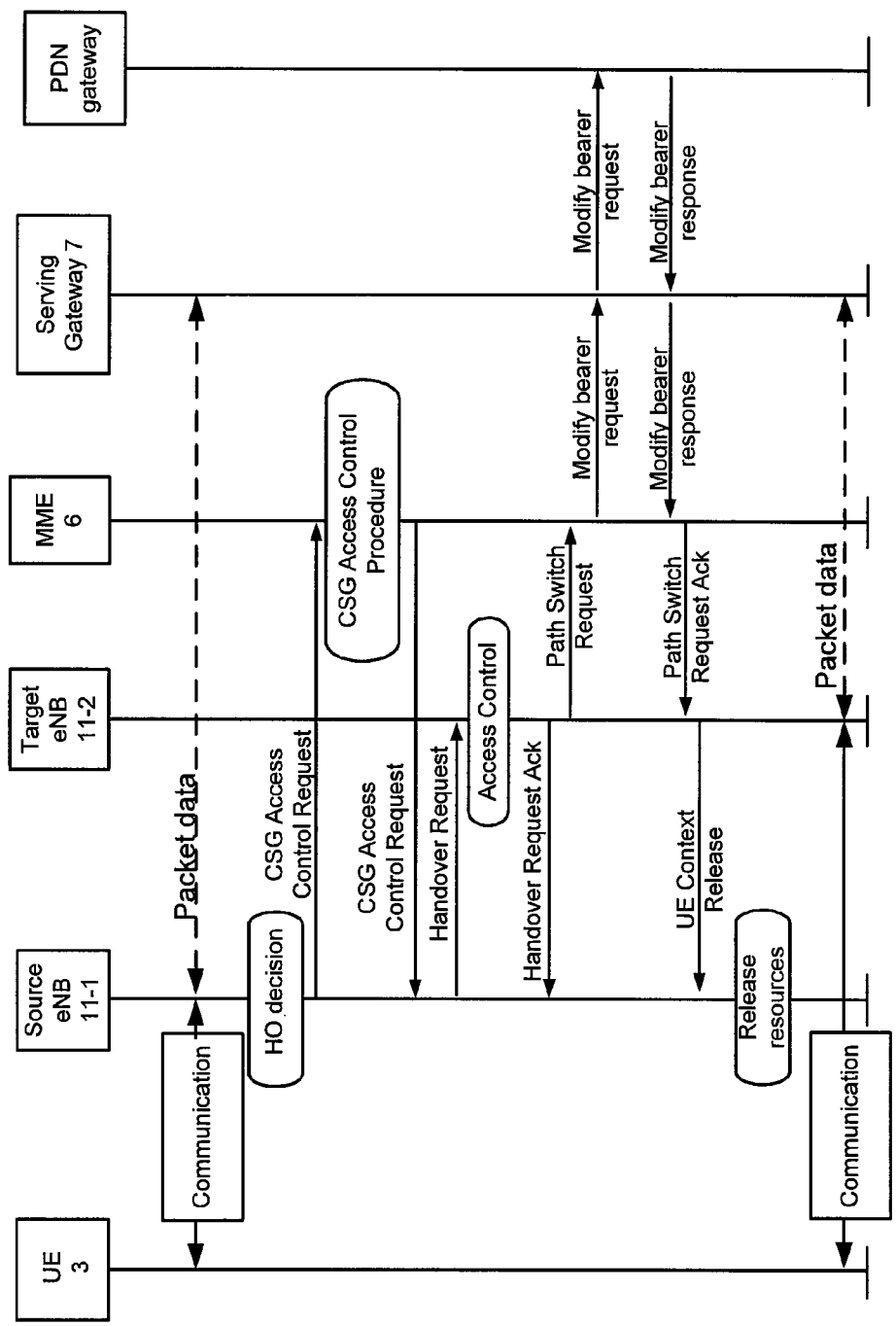
FIG. 8 is a timing diagram indicating another handover procedure by which communication with a mobile device is transferred between a source and target home base station based on communication over a second interface.

As shown in FIG. 8, once a mobile telephone 3 establishes communication with a source home base station 11-1 the source home base station 11-1 relays packet data between the mobile telephone 3 and the serving gateway of the core network 8 (via the HNB-GW 15). During communication between the mobile telephone 3 and source home base station 11-1 properties of the communication between the mobile telephone 3 and the home base station 11-1 and other base stations are measured to assist in control of the mobile telephone's connection mobility. The home base station 11-1 is operable to trigger the mobile telephone 3 to send a measurement report to the home base station 11-1.

Based on the measurement report information and/or other radio resource management (RRM) information, the source home base station 11-1 can determine whether or not to hand the mobile telephone 3 off to a target home base station 11-2. In the event that it is determined that the mobile telephone 3 is to be handed off to a target home base station 11-2, the source home base station 11-1 issues a CSG Access Control Request message to the MME 6 including the CSG ID and access mode for each cell, and access mode for each hybrid cell, operated by the target home base station 11-2. Unlike the CSG Access Control Request message sent for carrier aggregation purposes, however, the CSG Access Control Request message has the CSG Request Type indication set to indicate that the request is for the purposes of handover.

The MME 6 performs access control for each CSG cell based on the CSG ID(s) received in the CSG Access Control Request message and the stored CSG subscription data for the mobile telephone 3. If the access control procedure fails for all the CSGs, the MME 6 replies with the CSG Access Control Failure message.

Otherwise, the MME 6 generates a CSG Access Control Response message including the CSG ID of each target cell for which the access control/membership verification/charging assessment has been successful. For each hybrid cell (identified by the presence the Cell Access Mode in the CSG Access Control Request message) the MME 6 determines the CSG Membership Status of the mobile telephone 3 and includes it in the CSG Access Control Response message. The MME 6 sends the CSG Access Control Response message back to the source home base station 11-2.

The source home base station 11-1 transmits a handover request to the target home base station 11-2 which includes information necessary for the target home base station 11-2 to prepare the handover, such as information relating to quality of service and other parameters. The handover request message includes the CSG ID of each target cell for which the access control/membership verification/charging assessment has been successful and where appropriate the membership status (i.e. the CSG ID(s)/membership status included in the CSG Access Control Response).

The target home base station 11-2 verifies that the CSG ID(s) received in the handover request message match the CSG ID broadcast in each of the target cells and if such validation is successful and the necessary resources can be granted by the target home base station 11-2, then the target configures the required resources to provide the required quality of service etc. In the case of a hybrid access mode cell access by the mobile telephone 3 may be prioritised (over non-member mobile telephones using the hybrid cells) if the CSG Membership Status indicates that the mobile telephone 3 is a member.

The target home base station 11-2 may perform carrier aggregation for cells for which the access control/membership verification/charging assessment procedure has been successful. The target home base station 11-2 does not, however, perform carrier aggregation for those SCells 10 for which a CSG ID is not present in the handover request message. If none of the received CSG ID(s) correspond to a CSG ID broadcast by the target home base station 11-2 then handover resource allocation fails.

If a CSG Membership Status and associated CSG ID are received in the handover request message for a hybrid access mode cell but the CSG ID does not correspond to the CSG ID broadcast by the target cell, the target home base station 11-2 provides access to the cell, to the mobile telephone 3, as if it were a non-member. In this case, the target home base station 11-2 returns, in a handover request acknowledge message, the actual CSG ID broadcast by each target cell for which this applies.

Once the physical and link layer (L1 & L2) resources have been configured, the target home base station 11-2 sends the handover request acknowledgement message to the source home base station 11-1. The handover request acknowledgement message also includes a transparent container to be sent to the mobile telephone as a radio resource control, RRC, message to perform the handover.

Once the source home base station 11-1 has received the handover request acknowledgement, or as soon as the transmission of the handover command is initiated in the downlink, data forwarding can be performed so that data received at the source home base station 11-1 is forwarded to the target home base station 11-2 to be relayed to the mobile telephone 3.

The procedure continues with a path switch request procedure to request that the downlink GTP (GPRS tunneling protocol) tunnel is directed to a GTP tunnel endpoint at the target home base station 11-1, 11-2. Specifically, in response to a path switch request from the source home base station 11-1, the MME 6 transmits an update bearer request or a create session request to the serving gateway which may in turn relay this request to a packet data network gateway.

In the example described above with reference to FIG. 8 the source and target home base station 11-1, 11-2 are served by the same serving gateway in the core network. In this case, as shown in FIG. 8 a modify bearer request message is sent from the MME 6 to the serving gateway 7 and from the serving gateway 7 to the PDN gateway. As shown in FIG. 8 these messages are acknowledged by the serving gateway 7 and by the PDN gateway.

In the example described with reference to FIG. 8 the modify bearer request and path switch request message contains the data indicating the subscriber group access mode of each cell of the target base station and the associated CSG ID(s) and CSG membership indications.

After the down link path is switched in the core network, packets destined for the UE 3 are sent to the target home base station 11-2 and the resources previously reserved at the source home base station 11-1 for the connection to the mobile telephone 3 can be released although any ongoing data forwarding may continue.

Modifications and Alternatives

Various other modifications will be apparent to those skilled in the art and will not be described in further detail here.

In the above embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc.

In the embodiments described above, the mobile telephone and the home base station each include transceiver circuitry. Typically this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled form and may be supplied to the home base station or to the mobile telephone as a signal over a computer network, or on a recording medium. Further, the functionality performed by part or all of this software may be performed using one or more dedicated hardware circuits. However, the use of software modules is preferred as it facilitates the updating of the base stations, gateways, and the mobile telephones in order to update their functionalities.

It will be appreciated that the home base station 11 may determine (e.g. at S3 in FIG. 5) the access mode of the SCell 10 using a mechanism that does not necessarily involve the PCI, for example from the global cell identity (CGI) configuration or an explicit indication from an operations administration and maintenance (OAM) system.

In the specific examples described above with reference to FIGS. 7 and 8 the handover procedure is described with reference to a handover between two home base stations 11 one of which is connected via a HNB-GW 15. However, the same handover procedure may be used in handovers between two base stations in the following scenarios: both the base stations involved in the handover are directly connected to the MME 6 in the core network 8 instead of being connected via a HNB-GW 15; both the base stations involved in the handover are indirectly connected to the MME 6 in the core network 8 via one or more HNB-GWs 15; and/or one or both base stations involved in the transfer may be a macro base station (e.g an eNodeB or the base station 5 as shown in FIG. 1) instead of a home base station 11-1, 11-3. Further, the source base station may only operate a single cell (e.g. a macro cell).

In the specific example described with reference to FIG. 8, the target base station (to which the communication link is transferred) informs the MME 6 of the subscriber group access mode in which it is operating. However, in other examples the source base station may inform the MME of the subscriber group access mode of the target base station. In another embodiment the MME may only be told the identity of the target HNB and in response the MME may retrieve information on the subscriber group access mode for the target HNB from a database, either within the MME or the core network, or in one of the base stations or a base station gateway.

Figure 9:
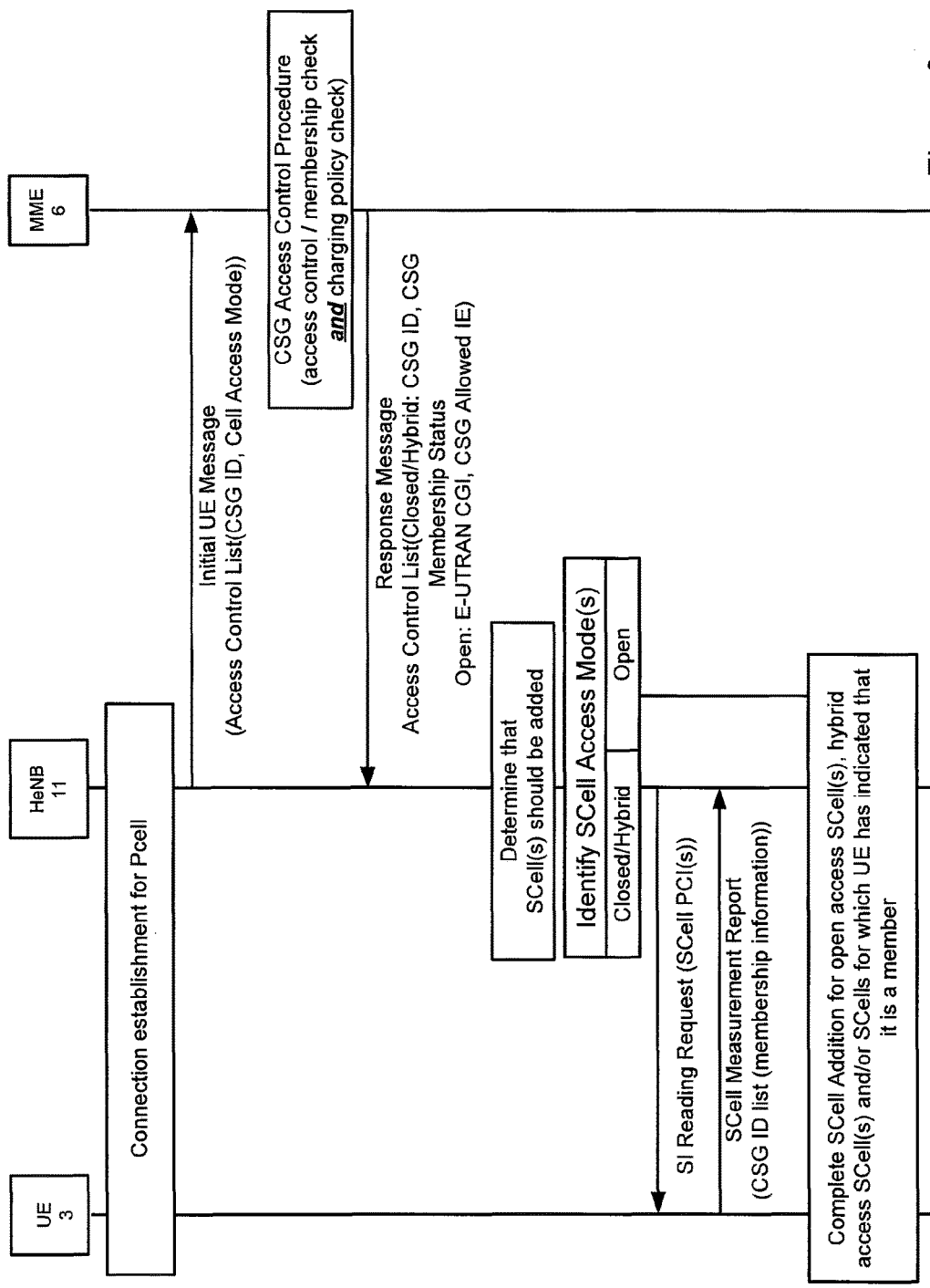
FIG. 9 is a timing diagram indicating another potential access control and charging assessment procedure for use in the system shown in FIG. 1.

In an alternative or additional embodiment, access control may be performed when a connection to a home base station is initially set up as illustrated in FIG. 9. In this case, a modified Initial UE Message (or possibly a dedicated message) may be sent in which an access control list comprising CSG IDs (where applicable) and possibly cell access mode are sent to the MME before any decision is made to add additional cells. This list may include every cell supported by the base station, may be limited to open access mode (and possibly hybrid access mode cells) supported by the base station and cells having a CSG of which the mobile telephone is known to be a member, or may be limited only to cells having a CSG of which the mobile telephone is known to be a member. Access control/membership verification/charging assessment may then be performed, in a similar manner to that described for FIG. 5, for each cell supported by the home base station (as represented by the access control list). The MME returns the results of the access control/membership verification/charging assessment procedure for each of these cells in an appropriate response message to indicate with carrier aggregation can be allowed or not. The home base station can then base a decision to configure the mobile telephone to use a particular SCell on the information received from the MME, and add the SCell subject to the mobile telephone confirming that it is a member of any closed access mode CSG.

Various other modifications will be apparent to those skilled in the art and will not be described in further detail here.

Although the invention made by the present inventor has been described based on several preferred exemplary embodiments, it should be understood that this invention is not limited to the exemplary embodiments but various modifications and changes are possible without departing from the spirit and scope of the invention.

This application is based upon and claims the benefit of priority from United Kingdom patent application No. 1113943.3, filed on Aug. 12, 2011, the disclosure of which is incorporated herein in its entirety by reference.

The invention claimed is:

1. A base station, comprising:
a memory storing instructions; and
one or more processors configured to execute the instructions to:
broadcast system information;
receive, from a user equipment (UE) connected to the base station, a measurement report which includes a Closed Subscriber Group Identity (CSG ID), wherein the CSG ID included in the measurement report is the CSG ID of a candidate cell to be added as a secondary cell that provides communications connectivity for said UE at the same time that communications connectivity is provided for said UE by a primary cell of the base station;
transmit, as part of a procedure for adding the candidate cell as the secondary cell, to a Mobility Management Entity (MME), a request to verify a CSG membership status of the UE, for the CSG ID included in the measurement report, wherein the request includes the CSG ID of the candidate cell to be added as the secondary cell, that provides communications connectivity for said UE at the same time that communications connectivity is provided for said UE by the primary cell of the base station, reported by the UE; and
receive, as part of the procedure for adding the candidate cell as the secondary cell, from the MME, a response which includes a CSG membership status information element providing a result of CSG membership verification performed at the MME.

2. A communications method in a base station, the communications method comprising:
broadcasting system information;
receiving, from a user equipment (UE) connected to the base station, a measurement report which includes a Closed Subscriber Group Identity (CSG ID), wherein the CSG ID included in the measurement report is the CSG ID for a candidate cell to be added as a secondary cell that provides communications connectivity for said UE at the same time that communications connectivity is provided for said UE by a primary cell of the base station;

transmitting, as part of a procedure for adding the candidate cell as the secondary cell, to a Mobility Management Entity (MME), a request to verify CSG membership, wherein the request includes the CSG ID of the candidate cell to be added as the secondary cell, that provides communications connectivity for said UE at the same time that communications connectivity is provided for said UE by the primary cell of the base station, reported by the UE; and receiving, as part of the procedure for adding the candidate cell as the secondary cell from the MME, a response which includes a CSG membership status information element providing a result of CSG membership verification performed at the MME.

3. A user equipment (UE), comprising:

a memory storing instructions; and one or more processors configured to execute the instructions to:

communicate with a base station to which the UE is connected; read system information which is broadcast in a candidate cell to be added as a secondary cell, the system information comprising a Closed Subscriber Group Identity (CSG ID), wherein the CSG ID included in a measurement report is the CSG ID of the candidate cell to be added as a secondary cell that provides communication connectivity for said UE at the same time that communications connectivity is provided for said UE by a primary cell of the base station; and transmit, to the first-base station, a measurement report which includes the CSG ID, included in the measurement report, of the candidate cell to be added as the secondary cell that provides communications connectivity for said UE at the same time that communications connectivity is provided for said UE by the primary cell of the first base station;

wherein the CSG ID the candidate cell to be added as of the secondary cell is transmitted, by the base station, as part of a procedure for adding the candidate cell as the secondary cell, to a Mobility Management Entity (MME), in a request to verify CSG membership; and wherein a CSG membership status information element providing a result of CSG membership verification performed at the MME is received at the base station, from the MME, as part of the procedure for adding the candidate cell as the secondary cell, in response to the request.

4. A communications method in a user equipment (UE), the communications method comprising:

communicating with a base station to which the UE is connected;

reading system information which is broadcast in a candidate cell to be added as a secondary cell that provides communications connectivity for said UE at the same time that communications connectivity is provided for said UE by a primary cell of the base station, the system information comprising a Closed Subscriber Group Identity (CSG ID), wherein the CSG ID included in a measurement report is the CSG ID of the candidate cell to be added as the secondary cell that provides communications connectivity for said UE at the same time that communications connectivity is provided for said UE by the primary cell of the base station; and transmitting, to the base station, a measurement report which includes information the CSG ID of the candidate cell to be added as the secondary cell that provides communications connectivity for said UE at the same time that communications connectivity is provided for said UE by the primary cell of the base station, wherein the CSG ID of the candidate cell to be added as the secondary cell is transmitted, by the base station as part of a procedure for adding the candidate cell as the secondary cell, to a Mobility Management Entity (MME), in a request to verify CSG membership; and wherein a CSG membership status information element providing a result of CSG membership verification performed at the MME is received at the base station, from the MME, as part of the procedure for adding the candidate cell as the secondary cell, in response to the request.

\* \* \* \* \*